United States Patent [19]

Eisenberg

[11] Patent Number: 4,618,222
[45] Date of Patent: Oct. 21, 1986

[54] PROTECTIVE STRUCTURE AND METHOD FOR WORKING ON SENSITIVE ELECTRONIC DEVICES

[75] Inventor: Philip H. Eisenberg, Downey, Calif.

[73] Assignee: Northrop Corporation, Hawthorne, Calif.

[21] Appl. No.: 644,599

[22] Filed: Aug. 27, 1984

[51] Int. Cl.[4] .................... G02B 21/00; H05F 3/02
[52] U.S. Cl. .................................... 350/582; 361/212
[58] Field of Search .............. 350/507, 582, 585, 589, 350/319, 579, 587; 361/212, 220

[56] References Cited

U.S. PATENT DOCUMENTS 3,801,418 4/1974 Cornelis et al. .................... 350/319

FOREIGN PATENT DOCUMENTS 1220630 7/1966 Fed. Rep. of Germany ...... 350/582
2547390 5/1977 Fed. Rep. of Germany ...... 361/212

OTHER PUBLICATIONS

Huang et al "Reliability Aspects of 0.5 μm & 1.0 μm Gate Low Noise GaAs FETS" Conf.: 17th Ann. Proc. Reliability Physics, San Francisco, Calif., Apr. 24–26, 1979, pp. 143–149.

Primary Examiner—William H. Punter
Attorney, Agent, or Firm—Terry J. Anderson; Robert B. Block

[57] ABSTRACT

Described for protecting precision electronic components from contamination such as moisture introduced by human workers during manufacture, repair or inspection cycles of the components is a shield structure having a self supporting transparent base on which an electrostatic conduction layer is supported to prevent a build-up of an electrostatic charge, and to prevent moisture from impinging on the component.

5 Claims, 4 Drawing Figures

PROTECTIVE STRUCTURE AND METHOD FOR WORKING ON SENSITIVE ELECTRONIC DEVICES

BACKGROUND OF THE INVENTION

This invention relates to the protection of precision electronic components, sensitive to contamination, such as moisture which might be introduced by human operators or workers, during manufacture, repair or inspection cycles, thereby causing damage of the components beyond repair and/or use.

For example, the manufacturing of hybrid microcircuits requires that a plurality of integrated circuit (IC) dies or circuit elements be manually attached by an assembler to a hybrid substrate and be bonded to other electronic components also attached to the substrate. Each of the attachment/bonding operations requires a subsequent quality inspection. Because of the miniature structures involved, it is necessary that both assembly and inspection work be performed under a microscope, with an operator in close proximity to the electronic component.

To maintain the extreme cleanliness required, the electronic device should be shielded from breath moisture, coughing moisture or perspiration of the worker/operator. In some instances, face masks are considered to be a solution to the problem, but workers often avoid their use because of the discomfort and restrictions associated with wearing such masks.

SUMMARY OF THE INVENTION

The present invention provides a transparent shield supported between the face of the worker and the electronic component under observation to prevent moisture from the operator from impinging on the component, as may occur due to an occasional sneeze or cough by the operator, or moisture from the breath of that operator.

This shield includes two layers: (1) a relatively thick and self-supporting base of transparent material, and (2) a very thin also transparent electrostatic conduction layer supported on the base to provide a continuous conductive surface, grounded to prevent a build-up of an electrostatic charge. In addition to preventing moisture from workers from impinging on and damaging the electronic components, the shield prevents damage to the electronic components from discharge of electrostatic charge buildup. Such electrostatic charge buildup often occurs under conditions of relative humidity due to movement of the operator's clothing and/or the operator's passing over carpeted areas and not being discharged before approaching the work station. Also, the shield will reduce the adhesion to the component of any dust or statically charged particles in the surrounding air.

DETAILED DESCRIPTION OF SPECIFIC EMBODIMENTS

Figure 1:
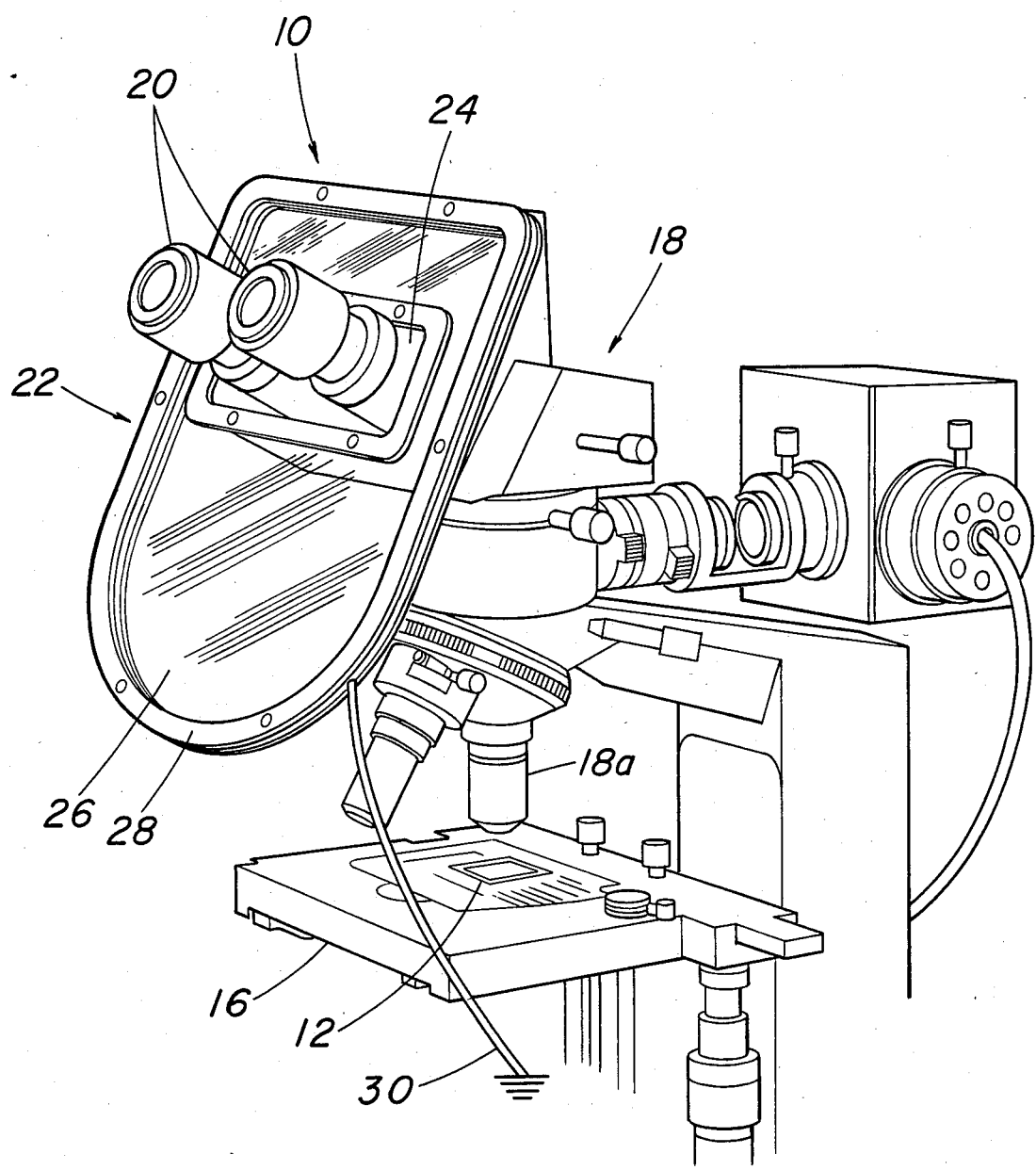
FIG. 1 shows a work station for assembling and inspecting hybrid microcircuits, including a microscope and the protective device the present invention.

FIG. 1 shows a portion of a work station, generally designated by the numeral 10. An electronic component 12 is held in position on a work support table 16, for observation by the operator/worker through a component image evaluating instrument, such as a microscope 18 having objectives 18a directed toward the component 12 and having at least one eyepiece 20 available for the operator's use.

Since moisture and/or electrostatic contamination introduced by the operator can have a potentially destructive effect on the electronic component 12, the latter should be protected at all times from such contamination. This is accomplished by mounting a faceplate or shield 22 at the work station between the electronic component and the operator. The shield may be supported on the microscope or other mounting structure in front of the nose and mouth of the operator whenever the latter looks through the eyepiece of the microscope. Although transparent or at least non-opaque, the shield 22 has an opening 24 which fits over the eyepiece of the microscope to hold the shield in position relative to the microscope. The lower portion 26 of the shield extends below the viewing stage a distance sufficient to intercept the breath or cough of the operator and also protects the operator from inadvertently striking the electronic component 12.

Around the periphery of the shield 22 is an electrically conducting rim 28, which is electrically connected to a suitable grounding element by an insulated wire conductor 30. The need for the ground connection 30 will be more fully discussed below.

Figure 2:
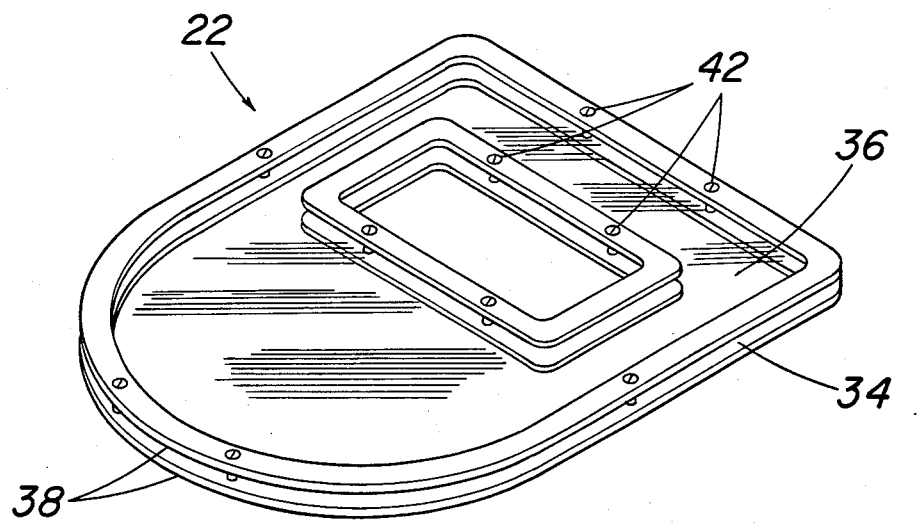
FIG. 2 shows the assembled shield of the protective device prior to its being mounted at the work station of FIG. 1.
Figure 4:
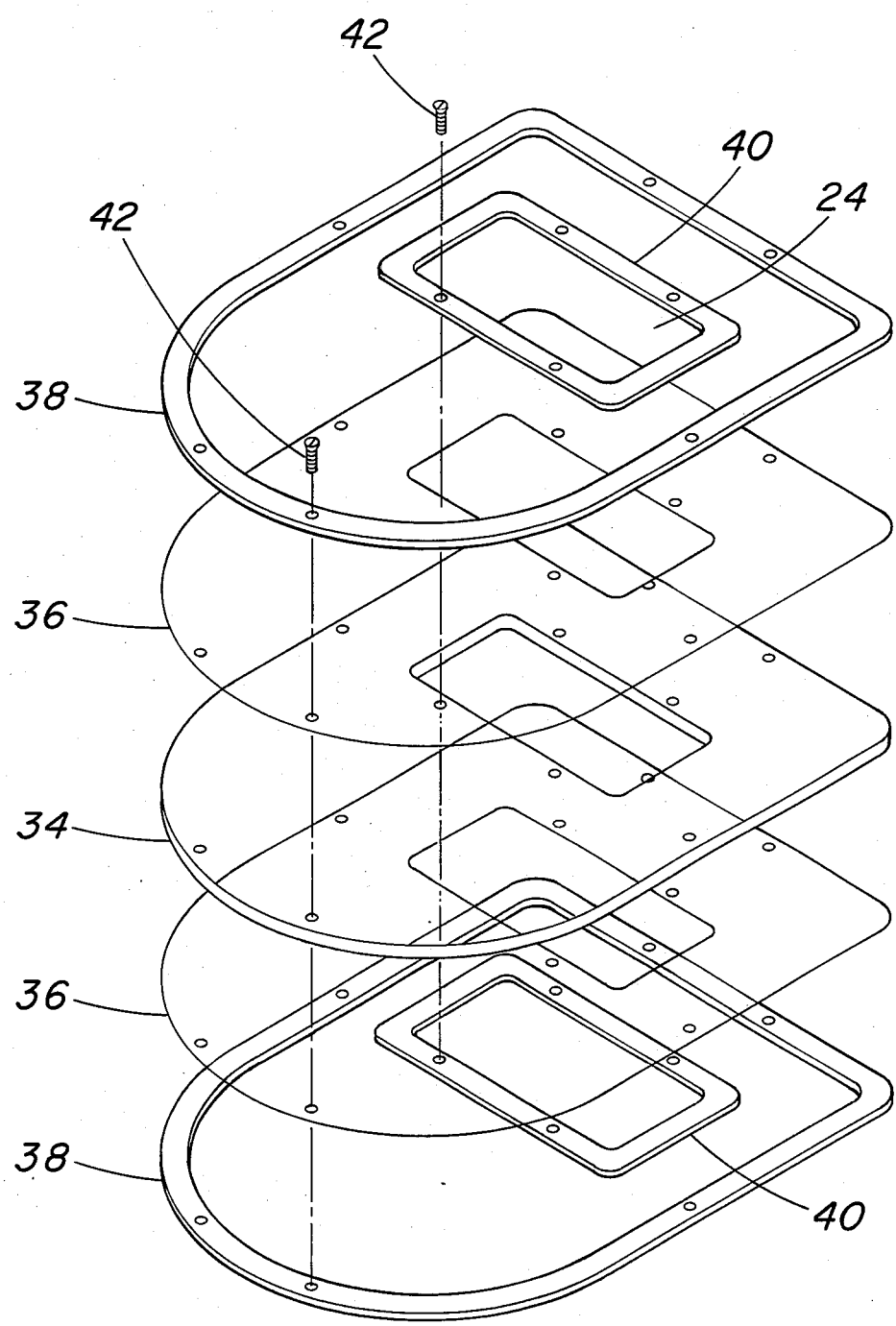
FIG. 4 is an exploded view of the elements comprising the shield of FIG. 2.

The faceplate may consist of several parts, which are shown as an assembled unit in FIG. 2 and as separate parts in the exploded view of FIG. 4. The supporting layer of the shield 22 is a plate 34, preferably formed of transparent material sufficiently thick to be self-supporting, such as a sheet of Plexiglas (TM). This synthetic resin or plastic material protects the electronic component 12 from moisture contamination by the operator.

As electronic components, either discrete or integrated circuit type components or assemblies are being assembled or inspected or otherwise processed by the operator, they are also subject to disabling damage if any electrostatic charge reaches them. Engaging the shield as by clothing of the operator may build up or transfer an electrostatic charge thereon. Such an electrostatic charge must be prevented from reaching the electronic components, either directly or through elements of the work station 10.

The preferred structure, to provide both protection from human contamination and protection from electrostatic discharge, is the shield assembly 22 of FIGS. 2 and 4. On each side of the supporting plate 34, a very thin layer of anti-static film 36 is laid. The plate 34 and the two layers of anti-static film 36 may be held in assembled position by metal rims 38, or bus bars which serve the dual purpose of retaining together the elements of the assembled shield 22, and of providing electrical conductivity to ground. Two metal rims 38 extend around the periphery of the shield and are located, respectively, above and below the shield. Two metal rims 40 extend around the opening 24 provided for the microscope eyepiece. The assembly of FIG. 2 is held together by suitable metallic fastening members 42 extending through aligned holes in the upper and lower of the metal rims 38 and 40, the supporting plate 34, and the anti-static film layers 36.

The material of the thin anti-static layers 36 is comprised of a continuous metallic film which (a) conduct any electrostatic charges to the metal rims, and thence to ground, but (b) are so thin as to provide reasonable transparency, so that the operator can view the electronic component 12 through the shield 22. This visibility is needed to enable the worker to view the electronic component while positioning or operating on the same under the microscope.

Figure 3:
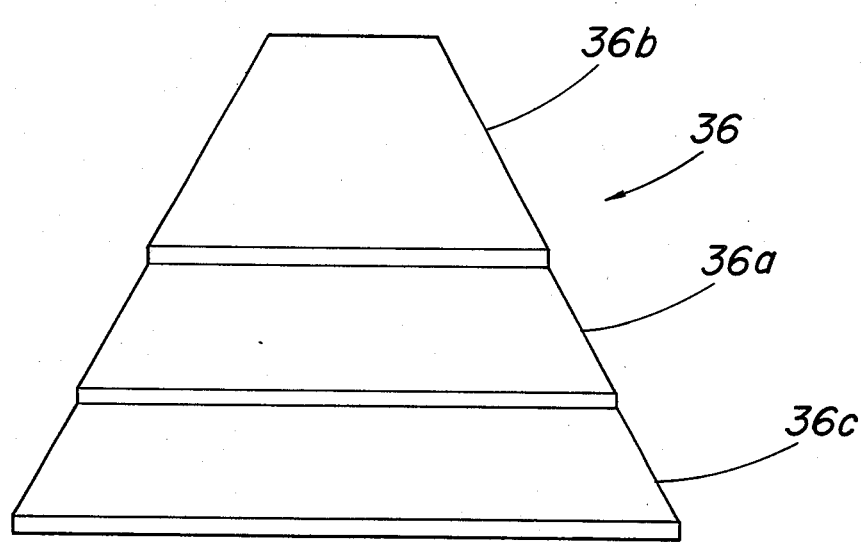
FIG. 3 is a showing of the layered construction of a known thin electrostatic-protection layered material.

One desirable material for use as the anti-static film layers 36 is a material, such as that designated as RCAS ® 4800, supplied by Richmond Division of Dixico Incorporated. As shown in FIG. 3, this static-shielding material is a three-layer film, which comprises a metallized electrical barrier 36a between a non-sparking outer layer of polyester 36b and an anti-static inner layer of polyethylene 36c.

The supplier's literature states: "A buried layer of stainless steel ($10^4$ ohms/sq.) sandwiches between an outer layer of tough polyester and an inner layer of RCAS ® 1200 antistatic pink polyethylene provides protection against all imposed static discharge damage without exposed sparking metal surfaces. The new RCAS ® 4800 static-shielding bag from Richmond eliminates shorting or the shedding of metallic particles that can be a problem with other conductive bags. The metallic layer is completely protected against the damage that can be caused by folding, creasing, abrading, or flexing of the material. The integrity of the metallic layer is not affected." The metallic fastening members 42 make contact with the metallic film 36, in order to conduct any electrical charge to the grounded metal rims 38.

It is optional whether the layers of anti-static film 36 are secured to the supporting shield 34 by adhesive material or are bonded thereto as by controlled heat treating. Further, an anti-static, transparent metallic coating may be deposited (as by vacuum deposition) directly onto the surface or surfaces of the plate 34. Also, conductivity along the periphery of the coated shield may be provided by an alternative conductive rim, formed of metal embedded in plastic, such as silver epoxy.

The minimum adequate thickness of the deposited metallic layer is determined by electrical measurement to ensure conductive continuity throughout the layer. If any areas are uncovered, an electrostatic charge can build up. Should the charge discharge to the electronic component, the high voltage of the charge is potentially destructive to the electronic components. Generally, the metallic layer needs to have a thickness of approximately 50 angstroms, in order to have the necessary continuity. Typically, adequate transparency is maintained up to a thickness of approximately 100 angstroms.

Alternatively, a conductive film layer may be applied directly to a support substrate, as by vacuum deposition. The thickness of the conductive layer may be controlled by the time of deposition, and other factors influencing the quantity of material deposited. Thereafter, a protective coating may be applied to cover the conductive layer to reduce the possibility of destroying continuity of the conductive layer.

The protective structure disclosed in this application provides essentially "fool-proof" protection for sensitive electronic and/or electrical components, both from human contamination and from electrostatic discharge. At the same time, functional efficiency in assembling and inspecting the components is not reduced.

It is further understood that variations or modifications of the present invention which lie within the scope of the appended claims are fully contemplated.

I claim:

1. In a processing station for manufacturing contaminatable parts on the slide stage of a microscope by an operator viewing through the microscope viewing stage, the improvement comprising a planar transparent cough shield mounted about said viewing stage, said shield extending laterally away from the microscope viewing stage in all directions in a plane generally normal to the viewing axis and oriented generally in a plane parallel to the face of the operator so that the operator may see through the cough shield for manipulating parts on the microscope slide stage, said shield extending below the viewing stage a distance sufficient to intercept the breath or cough of the operator, said shield being made of a self-supporting transparent layer, and a continuous anti-static sheet including a thin conductive film supported by said transparent layer to form an anti-static barrier thereon, said film extending fully across the transparent layer and said film being thin enough to be usefully transparent, means connecting the edges of said film to ground.

2. The structure of claim 1 in which the anti-static film comprises a composite sheet of three layers, the center layer being a continuous metallic layer, and the outer two layers being of plastic material to protect the metallic layer.

3. The structure of claim 1 in which said means connecting the film to ground includes a metallic rim extending around the periphery of the shield and anti-static sheet, the rim providing an electrically conductive connection of the conductive film to the ground.

4. The structure of claim 3 further including a plurality of metallic fastening members which retain the rim, shield and anti-static sheet in assembled relationship, and which further provides electrically conductive connection between the conductive film and the rim.

5. The structure of claim 1 wherein the continuous conductive film is formed by deposition of material directly on the surface of the transparent layer.

* * * * *